United States Patent [19]

Kuo

[11] 4,076,364
[45] Feb. 28, 1978

[54] WIRING DEVICE

[75] Inventor: Ted L. C. Kuo, Fanwood, N.J.

[73] Assignee: Thomas & Betts Corporation, Elizabeth, N.J.

[21] Appl. No.: 762,202

[22] Filed: Jan. 24, 1977

[51] Int. Cl.² .................................... H01R 13/58
[52] U.S. Cl. ............................ 339/103 R; 174/135; 339/116 C; 339/141; 339/156 R; 339/208
[58] Field of Search .......... 339/103 R, 103 M, 103 C, 339/101, 102 R, 105, 107, 116 C, 116 R, 141, 156 R, 208; 174/65 G, 135, 153 G, 92

[56] References Cited
U.S. PATENT DOCUMENTS 3,223,776  12/1965  Piasecki ........................ 174/92 X
3,957,336  5/1976  Bromberg ...................... 339/156 R Primary Examiner—Roy Lake
Assistant Examiner—DeWalden W. Jones
Attorney, Agent, or Firm—David Teschner; Jesse Woldman

[57] ABSTRACT

A selectively deflectable tab hingedly coupled to the cover portion of a two part wiring device is positionally responsive to the presence or absence of an obstruction located within a cable receiving notched opening in the housing portion of the device so that, in the absence of such cable, the tab will enter the notched opening to provide a seal thereat but will selectively tilt away from the opening upon contact with an obstruction located therein.

5 Claims, 10 Drawing Figures

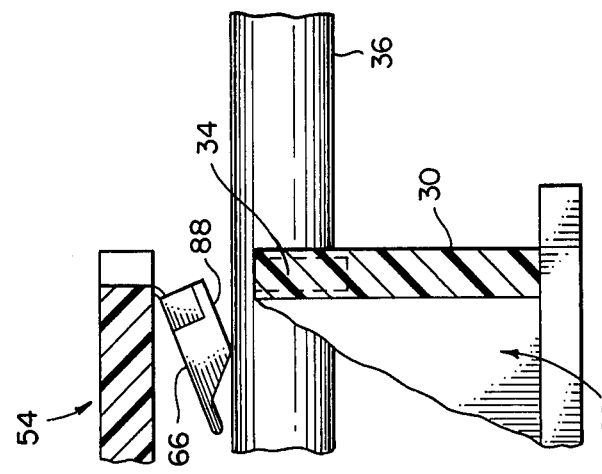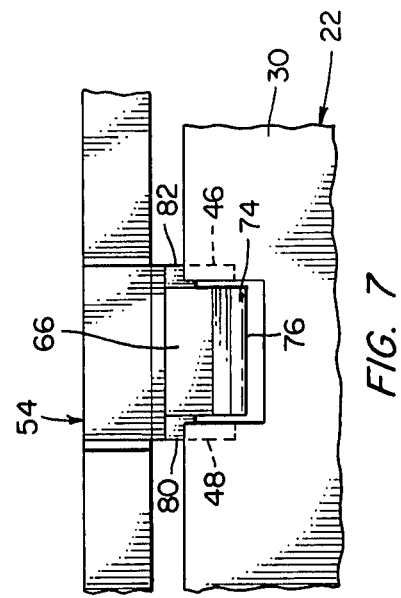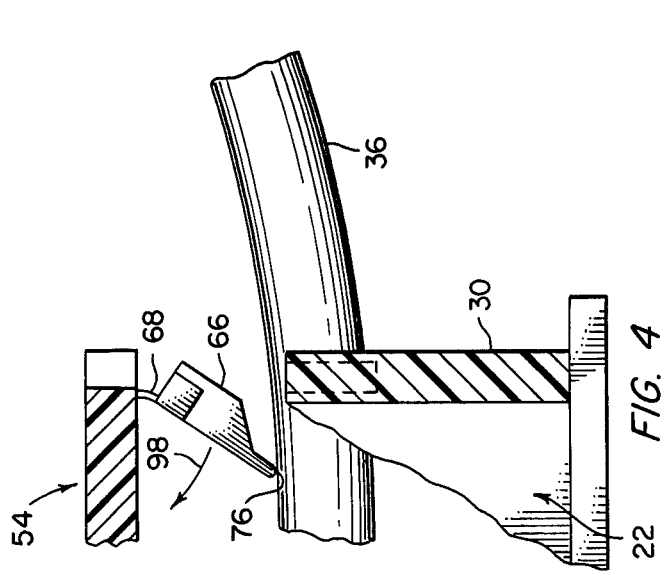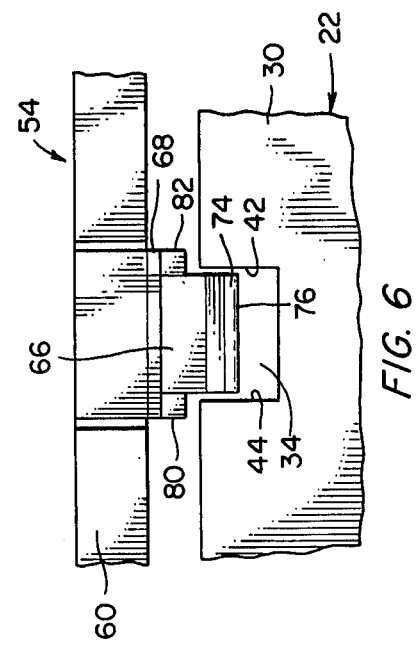

WIRING DEVICE

BACKGROUND OF THE INVENTION

1. Field of the Invention:

The invention is directed to the field of electrical wiring devices and principally to an improved seal and strain relief means therefor.

2. Description of the Prior Art:

In U.S. Pat. No. 3,957,336 issued May 18, 1976 to M. Bromberg and assigned to the assignee of the instant invention, there is shown a wiring device employing preferably molded elements including a body or housing and a mating cover which is arranged to snap over the body to provide an enclosed assembly. The body is provided with notched openings at either end through which one or more cables may be inserted for connection within the interior of the device. One feature of such prior art device is the inclusion of a sealing tab which is rigidly connected to the cover to mate with the notched opening in the body so that, in the event the device is employed as an end-of-the-line receptacle or the like, one of the tabs is broken away from the cover to provide an opening for such cable while the other tab is left undisturbed so that, upon closure of the cover to the body, the tab on the cover will extend into the notched opening in the body to provide a seal thereat. Alternatively, where the cable is to extend through both ends of the device, both tabs are removed to provide a suitable opening therefor. Where the user, however, inadvertently fails to remove such tab where required, the tab may be forced into direct engagement with the cable during the closure operation causing either severe deformation or a severing of the cable at the point of contact. Additionally, undue pressure is thus required to force the cover into locked engagement with the body under such condition which may also cause a distortion or fracturing of the cover and incomplete or improper closure of the device.

SUMMARY OF THE INVENTION

The invention overcomes the limitations and difficulties noted above with respect to such prior art devices by providing a combination seal and strain relief means capable of assuming selective positions relative to the cable receiving notched opening in an electrical wiring device. This is accomplished by providing a deflectable tab member hingedly coupled to the cover of the wiring device by a thin compliant web portion and located in such manner as to enter and completely close the notched opening in the body or housing of the wiring device as the cover is assembled to the body, or to tilt away from the opening and against the surface of a cable or similar element which is located in the notched opening during such assembly upon contact with such element. A foreshortened locking shoulder located at the upper portion of each side edge of the tab member is arranged to engage a respective channeled recess within the side edges of the notched opening to provide a lock thereat in the event no obstruction is present and the cover is assembled to a substantially fully closed position over the body. In the event the tab member encounters an obstruction, it is so coupled to the cover as to swing or tilt away from the notched opening to an extent governed by the size of the obstruction. It is therefore an object of this invention to provide an improved wiring device.

It is another object of this invention to provide a combination seal means and strain relief for an electrical wiring device.

It is a further object of this invention to provide a force responsive closure for the cable receiving opening in an electrical wiring device.

It is still another object of this invention to provide a self-adjusting closure for an electrical wiring device.

It is yet another object of this invention to provide a seal arrangement in a wiring device which will automatically compensate for the presence or absence of a cable in a cable receiving opening in such device.

It is still a further object of this invention to provide a reusable seal means for the cable receiving opening in an electrical wiring device.

Other objects and features will be pointed out in the following description and claims and illustrated in the accompanying drawings which disclose, by way of example, the principle of the invention and the best mode contemplated for carrying it out.

IN THE DRAWINGS

FIG. 4 is an enlarged fragmentary side elevational view, partly in section and similar to FIG. 3, showing the device of FIG. 1 in a further state of closure about a cable.

FIG. 5 is an enlarged fragmentary side elevational view, partly in section and similar to FIGS. 3 and 4, showing the device of FIG. 1 in a substantially complete state of closure about a cable.

FIG. 6 is an enlarged fragmentary front elevational view of a portion of the device of FIG. 1 showing the tab member in partial engagement with the unobstructed cable receiving opening.

FIG. 7 is an enlarged fragmentary front elevational view of a portion of the device of FIG. 1 showing the tab member in a further state of engagement with the unobstructed cable receiving opening.

Similar elements are given similar reference characters in each of the respective drawings.

DESCRIPTION OF THE PREFERRED EMBODIMENTS

Figure 1:
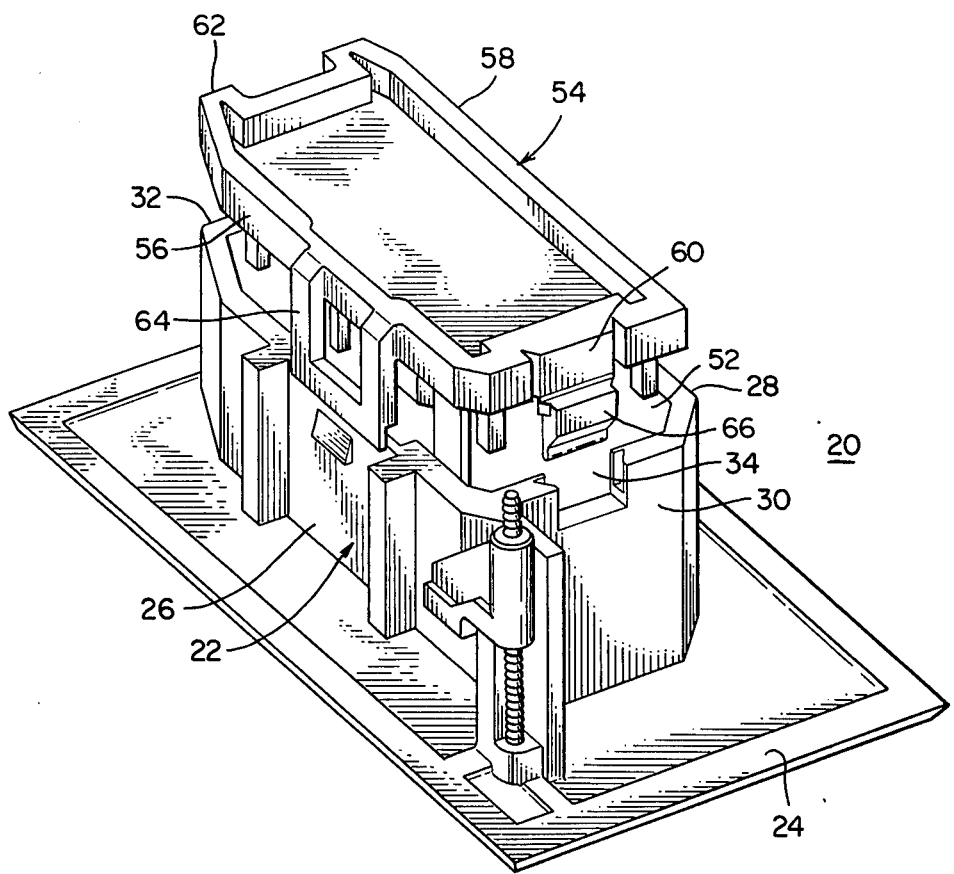
FIG. 1 is a perspective view, partly cut away and partly in section, of a wiring device incorporating a deflectable tab member constructed in accordance with the concepts of the invention.
Figure 2:
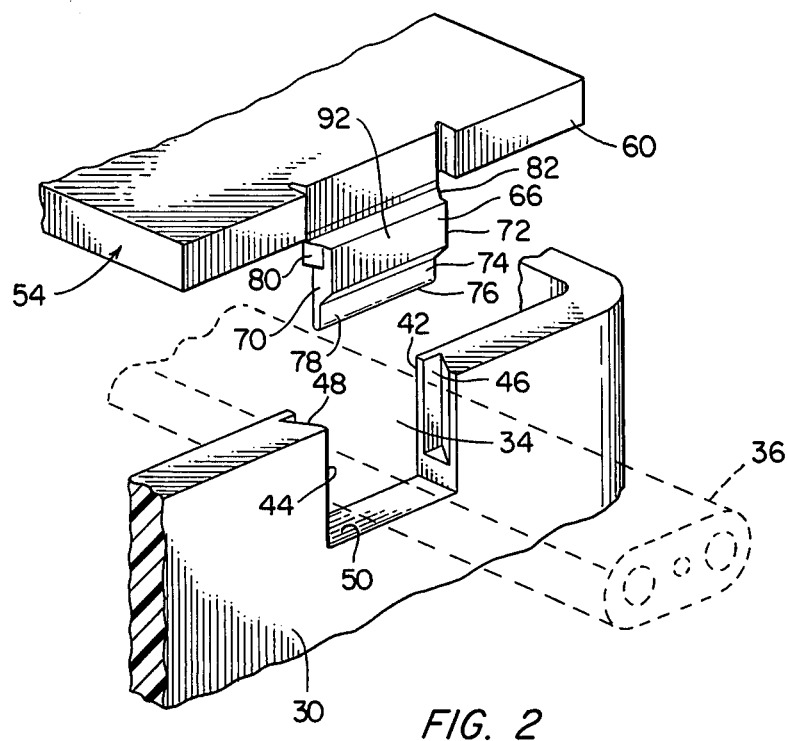
FIG. 2 is an enlarged fragmentary perspective view, partly in section, of a portion of the device of FIG. 1.
Figure 3:
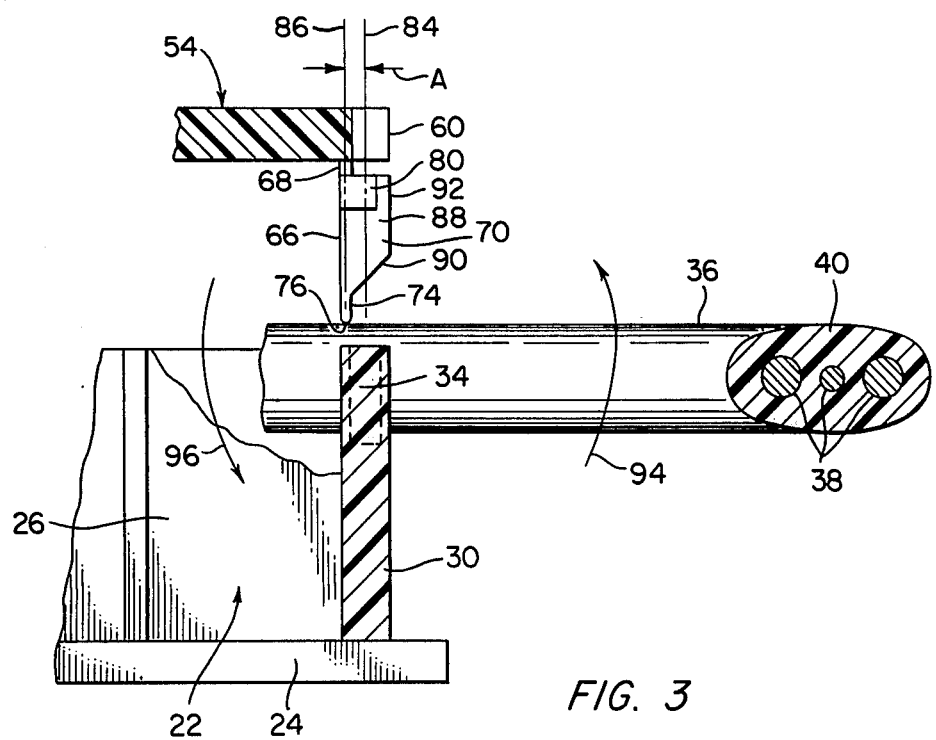
FIG. 3 is an enlarged fragmentary side elevational view, partly in section, showing the device of FIG. 1 in a first stage of closure upon a cable.

Turning now to FIGS. 1 through 7, there is shown an electrical wiring device 20 (FIG. 1) essentially similar to that more fully described in the above mentioned patent. It should be appreciated that although the following description will, for purposes of convenience, refer to the instant invention as employed therewith, no such limitation is intended and that the instant invention may be employed with other wiring devices (not shown) having a similar construction. The device 20 comprises a housing portion 22 seated on a face plate 24 and defined by a pair of opposing sidewalls 26 and 28, and a pair of opposing end walls 30 and 32, forming a box-like enclosure within which may be included appropriate terminal elements for engagement with the conductors of a cable in a manner for example, as more fully described in the above mentioned patent. Each of the end walls 30 and 32 is provided with a notched opening only one of which is visible in FIG. 1 and is designated by the numberal 34. The opening 34 is designed to provide an entry way for a cable, a portion of which is shown by the dotted outline designated 36 in FIG. 2. The cable 36 may comprise the usual 2 or 3 conductor nonmetallic sheathed cable commonly employed in wiring systems for residential and commercial structures and characterized by individual conductors 38 (FIG. 3) surrounded by a sheath of insulating material 40 forming a semi-rigid unitary structure. The opening 34 includes opposing side edges 42 and 44 each of which is provided with a channeled recess 46,48 respectively, and a bottom edge 50 (FIG. 2) defining the opening 34. The bottom edge 50, although shown as unchanneled, may also be provided with a recess such as 46 or 48, if necessary or desirable, as will be considered in further detail hereafter. The housing 22 is formed so as to provide an open top portion 52 adapted to receive a preferably flat cover portion 54 having opposing sides 56 and 58, opposing ends 60 and 62, and latch means extending from each of the sides 56 and 58, only one of which is visible in FIG. 1 as extending from the side 56 and designated 64. The cover portion 54 is dimensioned to fit over the open top portion 52 to provide a releasable closure thereat. To close the notched opening 34 in the housing portion 22 when appropriate, there is provided a deflectable tab 66 (FIG. 1) extending downwardly from each end 60 and 62 of the cover portion 54, only one of such tabs 66 being visible in FIG. 1 extending from the end 60 although a similar tab is provided at the end 62 of the cover portion 54. The tab 66 is hingedly coupled to the cover portion 54 by a thin compliant web portion 68 (FIG. 3) and is free to pivot or tilt thereabout as will be described in greater detail hereafter. The tab 66 includes side edges 70 and 72 (FIG. 2) extending from the web portion 68 to its free end 74 which is shown as having a rounded edge 76 and a generally flat section 78 of substantially uniform thickness. Extending outwardly from each of the side edges 70 and 72 of the tab 66 immediately adjacent the web portion 68 is a locking shoulder 80,82, respectively, arranged to be received within a respective recess 46,48, in the notched opening 34, the tab 66 being located on the cover portion 54 so as to be aligned with the notched opening 34 when the cover portion 54 is suitably positioned over the housing portion 22. It will be noted that the locking shoulders 80 and 82 have a length substantially shorter than the length of the tab 66. The remaining dimensions of the tab 66 such as its width, thickness, and length, are selectively arranged to closely approximate the corresponding dimensions of the notched opening 34 so that, in the case where the tab 66 is employed as a seal means, it will enter the opening 34, substantially as shown in FIGS. 6 and 7, and effect a complete closure thereof. The locking shoulders 80 and 82 are dimensioned to have a length preferably less than one half the length of the corresponding sides 70 and 72 of tab 66, the actual length of each shoulder 80,82 thus determining the point at which the shoulders 80 and 82 engage the respective recesses 48 and 46 of the opening 34 to provide an interlock therebetween. Prior to such engagement the tab 66 is free to pivot about the web portion 68 where a suitably directed force has been applied thereto as, for example, by the presence of an obstruction in the opening 34. Such obstruction may include a portion of a cable such as 36 seated across the opening 34 substantially as shown in FIGS. 3, 4, and 5. The manner in which the tab 66 may be tilted or pivoted away from the opening 34 may be more fully appreciated by reference to FIG. 3 wherein the tab 66 is shown as having a central longitudinal axis 84. Offset from the axis 84 by the dimension A and substantially parallel thereto is a further axis 86 along which lie the web portion 68 and the end portion 74 including the edge 76 of the tab 66. Intermediate the end portion 74 of the tab 66 and the web portion 68 is a thickened portion 88 (FIG. 3) which communicates with the end portion 74 along a tapered section 90, the thickened portion 88 having a preferably planar outer surface 92 and a thickness preferably substantially equal to the thickness of the end wall 30 to provide a relatively smooth transition between the outer surface of the wall 30 and the exposed surface of the thickened portion 88 where the tab 66 is present in the opening 34. FIG. 3 illustrates the first stage in the assembly of the cover portion 54 to the housing portion 22 of the device 20 to provide a connection to the cable 36 a portion of which is seated within the notched opening 34. As the cover portion 54 is urged towards the housing portion 22 the edge 76 of the tab 66 is caused to contact the outer surface of the cable 36 along a line offset from the center of the thickness of the opening 34 as a result of the particular axial location of the edge 76 which is selected so as to lie to one side of the central axis of the opening 34, which axis is arranged to be substantially colinear with the central axis 84 of the tab 66. Accordingly, as further pressure is applied to the parts 54 and 22 to urge them together, the cable 36 is subjected to a force couple shown by the arrows 94 and 96 in FIG. 3. The resulting torque will tend to tilt the cable upwardly to the right of the opening 34 and downwardly to the left of the opening 34, as viewed in FIG. 3, wherein that portion of the cable 36 directly adjacent the opening 34 will assume a position substantially as shown in FIG. 4. The edge 76 of the tab 66 will thus tend to slide towards the left of its original axial position as a result of the offset angular force being applied thereto and will tend to pivot about the web portion 68 in a direction shown by the arrow 98 in FIG. 4. The sliding action of the tab edge 76 is enhanced by the smooth rounded configuration thereof. As further pressure is applied to urge the cover portion 54 and the housing portion 22 together, the tab 66 is tilted or pivoted to an increasingly greater degree away from its original axial position, substantially as shown in FIG. 5, whereby the outer surface of the thickened portion 88 is caused to contact and be against the adjacent surface of the cable 36, thus providing both a seal within the area of contact and a strain relief thereat tending to resist the removal of the cable 36 from the device 20. The depth of the notched opening 34 is designed to permit the cover portion 54 to sit tightly over the open top portion 52 of the housing portion 22 while accepting the full thickness of both the cable 36 and the tab 66. It will, of course, be appreciated that, due to the self-adjusting nature of the tab 66 with respect to the degree of tilt assumed thereby upon contact with an obstruction in the opening 34 such as cable 36, various thicknesses of cables may be readily accommodated and effectively retained in the manner described heretofore, the tab 66 having the capacity to adjust to such varying thicknesses due to the compliant nature of the web portion 68. It should also be noted that, in the preferred embodiment, the tab 66 and the cover portion 54 are formed preferably from a plastic material having good electrically insulating properties and may be conveniently molded as an integral part with the web portion 68 being defined by a thin plastic section having good recovery characteristics. Thus, the tab 66 may be repeatedly subjected to the pivoting torque and will tend to return to its initial position in which it is planarly oriented substantially normal to the plane of the cover portion 54. This feature permits the device 20 to be reused with or reconnected to one or more cables of either the same or different thicknesses relative to the original cable used in the first assembly without impairing the sealing and strain relief feature thereof. FIGS. 6 and 7 illustrate the manner in which the tab 66 will enter and lock within the opening 34 in the housing portion 22 in the absence of an obstruction. As seen in FIG. 6, the width of the tab 66 is dimensioned to be substantially equal to the width of the opening 34 between the side edges 42 and 44. Thus, as the cover portion 54 is urged towards the housing portion 22 the tab 66, being suitably located on the cover portion 54, is progressively directed into the opening 34. However, prior to the entry of the locking shoulders 80 and 82 into the respective recesses 48 and 46, the tab 66 is still free to tilt or pivot about the web portion 68 thereby permitting its deflection away from the opening 34 in the event of contact with an obstruction in the opening 34. As the cover portion 54 is brought closer to the housing portion 22 the shoulders 80 and 82 of the tab 66 enter the recesses 46 and 48, substantially as shown in FIG. 7, thereby restraining the tab 66 from any further pivoting action while further realigning the tab 66 within the opening 34 so as to result in a complete closure of the opening 34. The length of the tab 66 is selectively chosen so that, upon complete closure of the cover portion 54 to the housing portion 22, the tab 66 will substantially occupy the entire opening 34 thereby providing an effective seal thereat.

Figure 8:
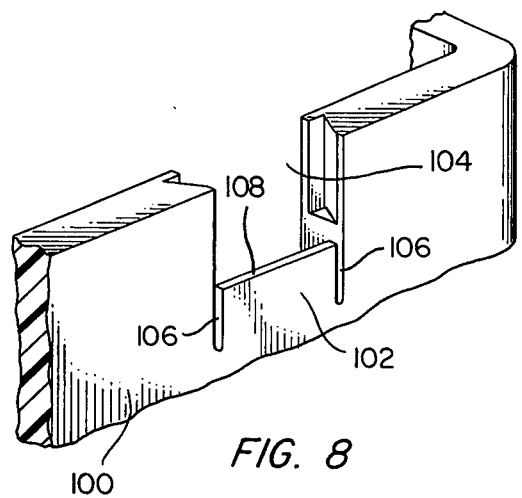
FIG. 8 is an enlarged fragmentary perspective view, partly in section, showing a modification of the housing portion of the device of FIG. 1.
Figure 9:
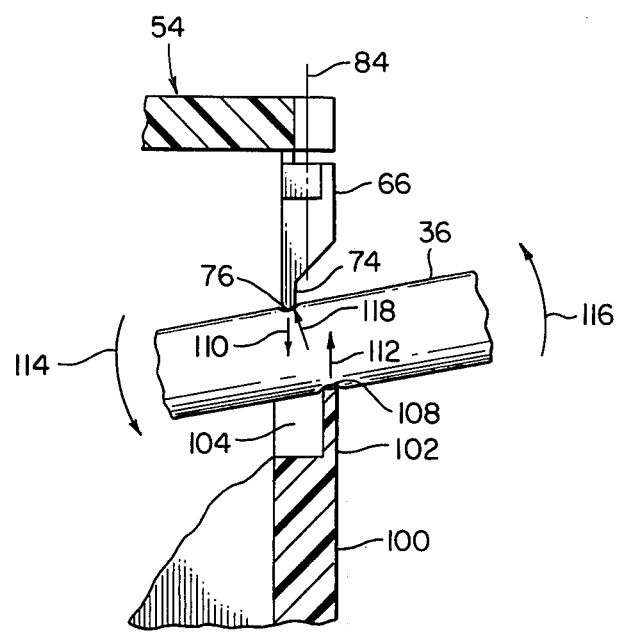
FIG. 9 is an enlarged fragmentary side elevational view, partly in section, of the modification of FIG. 8.
Figure 10:
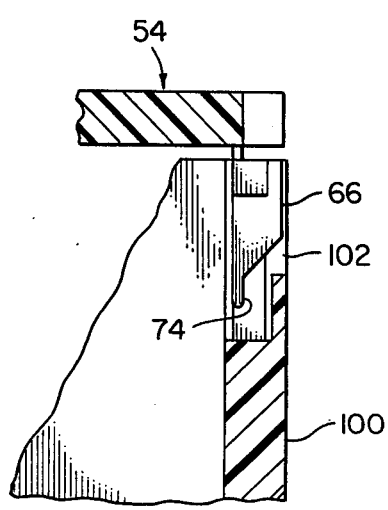
FIG. 10 is an enlarged fragmentary side elevational view, partly in section, showing the deflectable tab in cooperative relationship with the modified housing of FIG. 8.

Turning now to FIGS. 8, 9 and 10, there is shown a modified end wall 100 similar to end wall 30 of the housing portion 22 but including a partition 102 shielding a portion of a notched opening 104 which opening otherwise corresponds to opening 34 of the device 20. The partition 102 is separated from the remainder of the wall 100 by slits 106 arranged to permit the partition 102 to be readily broken away from the wall 100 to enlarge the opening 104, where necessary or desirable. The partition 102, which has a thickness somewhat less than that of the remainder of the wall 100 is located towards the front or outer surface of the wall 100 so as to be offset from the central plane thereof but substantially parallel thereto. As is more clearly seen in FIG. 9, the wall 100 has top edge 108 which is axially offset from the edge 76 of the tab 66 as the two parts are brought together. The degree of offset is shown by the two arrows 110 and 112 which also indicate the respective lines of force application upon the cable 36 during the closure operation, which forces accentuate the degree of torque to which the cable 36 is subjected in this operation, the direction of movement of the cable 36 under the influence of such forces being indicated by the arrows 114 and 116. The tab 66 will thus be subjected to a counteracting force 118 perpendicular to the longitudinal axis of the cable 36 but angularly offset from the central axis 84 of the tab 66 to a greater degree than that provided by the arrangement shown in FIG. 3, which will tend to more expeditiously subject the tab 66 to a tilting or pivoting force. In the absence of an obstruction such as cable 36 in the opening 104, the position of the tab 66 with respect to the partition 102 is essentially as shown in FIG. 10, that is, the free end portion 74 is seated behind the partition 102 with the enlarged portion 88 of tab 66 overhanging the top edge 108 of the partition 102. Although it will be noted that the length of the tab 66 in the embodiment shown in FIGS. 8 through 10 is somewhat less than the full depth of the opening 104, a full closure of the opening 104 is still attained as a result of the overlap obtained between the tab end 74 and the partition 102.

I claim:

1. In an electrical wiring device of the type having, in combination, a housing portion have opposing end walls and opposing sidewalls arranged in a box-like configuration with an open top portion and wherein at least one of said end walls has a notched opening which communicates with said open top portion and has a channeled recess extending within each side edge defining said notched opening, and a generally flat cover portion arranged to fit over and seat upon said open top portion, the improvement comprising: a rigid tab member hingedly coupled to said cover portion by a thin compliant web portion, said tab member being located on said cover portion so as to be aligned with said notched opening in said housing portion when said cover portion is placed over said housing portion adjacent said open top portion in a preselected position, said tab member being pivotally displaceable about said web portion from a first position wherein said tab member is aligned with said notched opening to a second position wherein said tab member is tilted away from said notched opening, said tab member having a central longitudinal axis and being coupled to said cover member along a first axis offset from and parallel to said central longitudinal axis to cause said tab member to be subjected to a pivoting torque upon its contact with an obstruction located within said notched opening, said tab member including a locking shoulder extending outwardly from either side thereof adjacent said web portion and having a length substantially shorter than the length of said tab member, said locking shoulders being dimensioned to engage a respective channeled recess in said notched opening to provide a lock therebetween in the event no obstruction is present in said notched opening and said cover portion is in a substantially fully seated position over said open top portion of said housing portion, said tab member terminating in an extending free end portion opposite said web portion, said free end portion having a rounded edge to facilitate sliding engagement with an obstruction in said notched opening, said free end portion being located along said first axis in alignment with said web portion.

2. The improvement as defined in claim 1 wherein said tab member comprises a section of uniform thickness, said tab member having a thickened portion axially offset from and communicating with said free end portion along a tapered section, said central longitudinal axis passing through said thickened portion, said thickened portion being arranged to lie against an obstruction such as a cable in said notched opening to provide a strain relief thereat.

3. The improvement as defined in claim 2 wherein said thickened portion comprises a substantially planar outer surface for seating intimately against an obstruction such as a cable located in said notched opening.

4. The improvement as defined in claim 3 wherein said tab member is formed integrally with said web portion.

5. The improvement as defined in claim 1 wherein said tab locking shoulder has a length less than one half the length of said tab member.

* * * * *